United States Patent
Owada

(10) Patent No.: US 10,808,905 B2
(45) Date of Patent: Oct. 20, 2020

(54) VEHICULAR LAMP

(71) Applicant: STANLEY ELECTRIC CO., LTD., Tokyo (JP)

(72) Inventor: Ryotaro Owada, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/513,731

(22) Filed: Jul. 17, 2019

(65) Prior Publication Data
US 2020/0025350 A1 Jan. 23, 2020

(30) Foreign Application Priority Data

Jul. 18, 2018 (JP) .................................. 2018-135041

(51) Int. Cl.
F21S 41/64 (2018.01)
F21S 41/33 (2018.01)
F21S 41/135 (2018.01)
F21S 41/27 (2018.01)
G02F 1/1335 (2006.01)

(52) U.S. Cl.
CPC ........... F21S 41/645 (2018.01); F21S 41/135 (2018.01); F21S 41/27 (2018.01); F21S 41/335 (2018.01); G02F 1/133526 (2013.01); G02F 1/133528 (2013.01); G02F 1/133553 (2013.01); G02F 2001/13355 (2013.01)

(58) Field of Classification Search
CPC ........ F21S 41/135; F21S 41/27; F21S 41/335; F21S 41/645; G02F 1/133526; G02F 1/133528; G02F 1/133553; G02F 2001/13355

See application file for complete search history.

(56) References Cited

U.S. PATENT DOCUMENTS

| | | | |
|---|---|---|---|
| 10,054,280 B2* | 8/2018 | Hirata | F21S 41/153 |
| 10,571,090 B2* | 2/2020 | Toko | G02B 27/283 |
| 2019/0390836 A1* | 12/2019 | Hirata | F21S 41/13 |
| 2020/0011501 A1* | 1/2020 | Kunii | F21S 41/143 |

FOREIGN PATENT DOCUMENTS

| | | | |
|---|---|---|---|
| DE | 102013113807 A1 | 6/2015 | |
| DE | 102016109530 A1 | 11/2017 | |
| JP | 2011233305 * | 11/2011 | ............ F21S 41/465 |
| JP | 2017-212210 A | 11/2017 | |

* cited by examiner

Primary Examiner — Peggy A Neils
(74) Attorney, Agent, or Firm — Xsensus LLP

(57) ABSTRACT

A vehicular lamp includes: a light source; a projection optical system that projects light emitted from the light source forward; a liquid crystal element arranged at a rear focal point of the projection optical system; a first polarizing plate disposed in an optical path between the liquid crystal element and the projection optical system, for transmitting light of a specific polarization component; a condensing optical system that condenses the light toward the liquid crystal element; a polarizing beam splitter that transmits first light with one polarization component and reflects and separates second light with the other polarization component; a reflecting optical system that reflects the first light toward the liquid crystal element; and a polarization rotation element that rotates a polarization direction of one of the first light and the second light to coincide with the other light in terms of a polarization direction thereof.

20 Claims, 12 Drawing Sheets

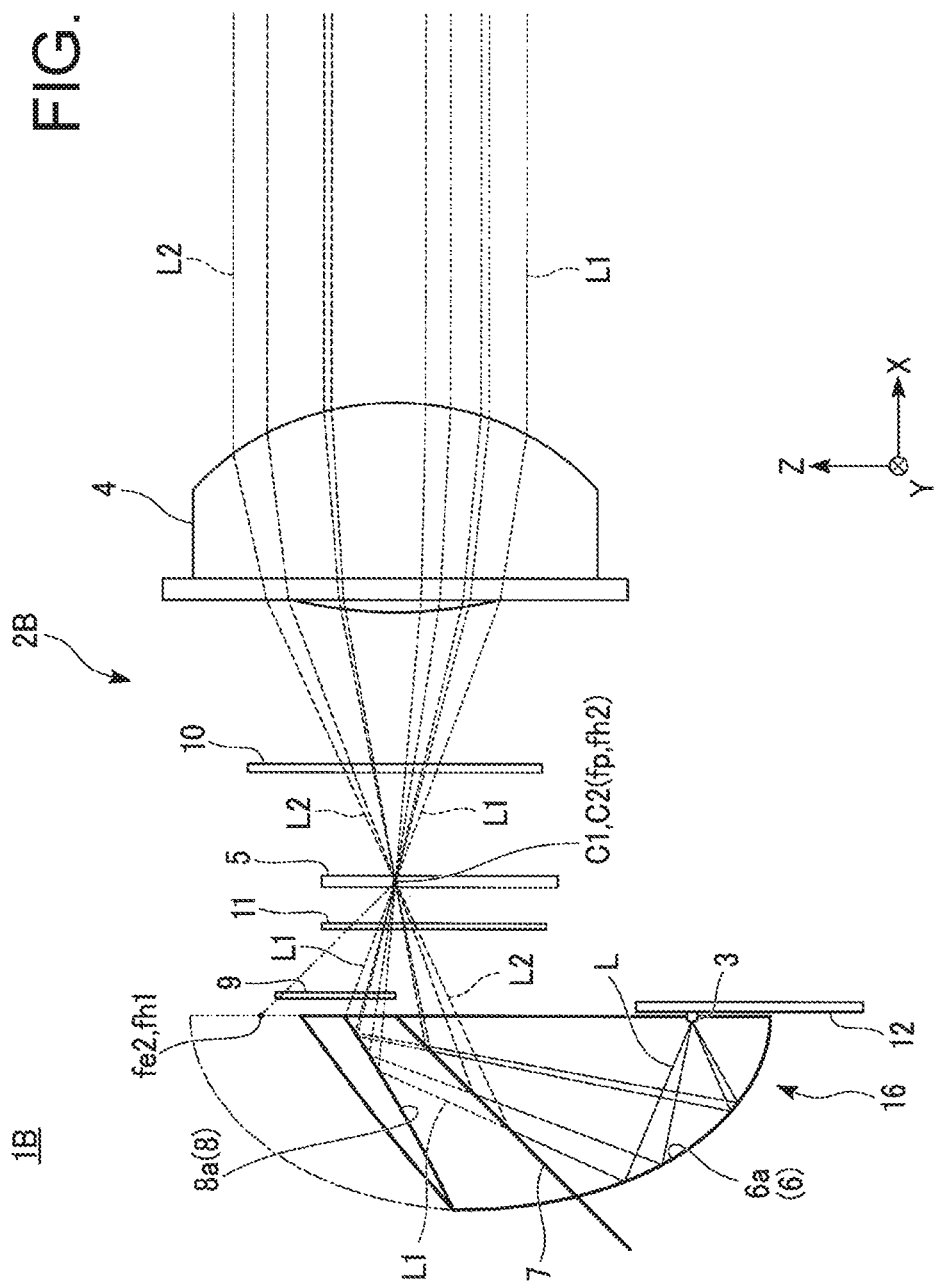

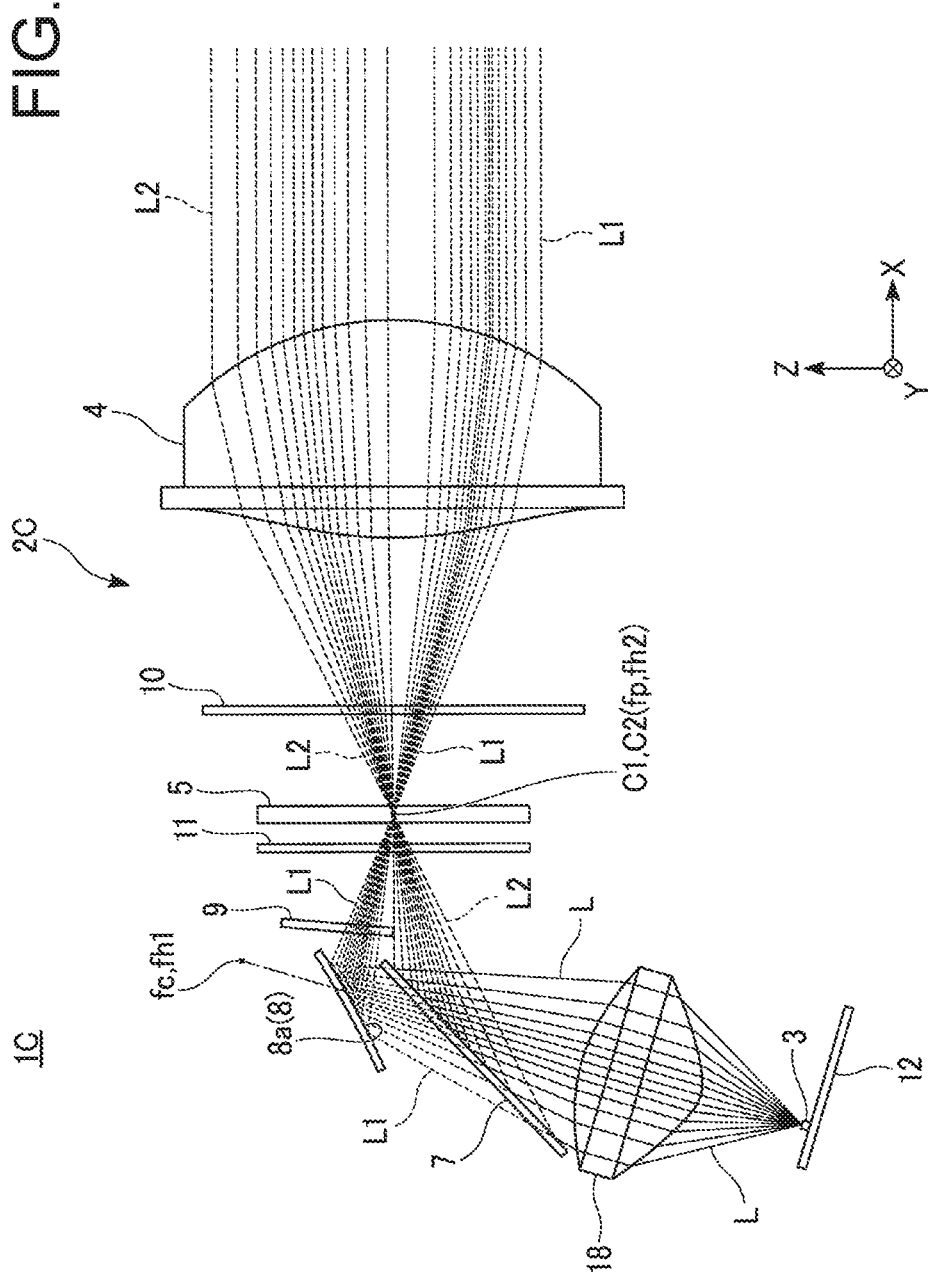

VEHICULAR LAMP

This application claims the priority benefit under 35 U.S.C. § 119 of Japanese Patent Application No. 2018-135041 filed on Jul. 18, 2018, which is hereby incorporated in its entirety by reference.

TECHNICAL FIELD

The present invention relates to vehicular lamps, and in particular, to a vehicular lamp with high light utilization efficiency and simple structure.

BACKGROUND ART

In recent years, variable light distribution headlamps (referred to as ADB (Adaptive Driving Beam) system) configured to variably control light distribution patterns projected toward the front of a vehicle body are being developed. ADB is a technique for enlarging the field of front vision of a driver at night by recognizing the surrounding conditions of a preceding vehicle, an oncoming vehicle, or the like with an in-vehicle camera and blocking light that would give glare to the preceding vehicle or the oncoming vehicle.

Meanwhile, as one of techniques for realizing such a vehicular lamp, light emitted from a light source is separated into light of two polarization components, and light of each polarization component is controlled and used by a liquid crystal element (for example, see German Patent Application Publication No. DE 10 2013 113807 A1 and Japanese Patent Application Laid-Open No. 2017-212210 A).

For example, the aforementioned German Patent Application Publication discloses a configuration in which light fluxes emitted from a light source 240 are separated into two polarization components of transmitted light 252 and reflected light 254 by a polarization splitting mirror 250, the transmitted light 252 is projected through a liquid crystal element 272, a polarizer 282, and a projection lens 292, and the reflected light 254 is reflected by a reflecting mirror 260, and then projected through a liquid crystal element 274, a polarizer 284, and a projection lens 294.

On the other hand, the aforementioned publication of Japanese Patent Application discloses an automobile headlight (10) including a light source (20); a polarizing beam splitter (30) provided in an optical path of the light source (20) and configured to divide light coming from the light source (20) into two partial components polarized differently from each other in two partial optical paths (S1, S2); a first liquid crystal mask (40), a first polarizing filter (50) and a first lens (60) provided in the first partial optical path (S1); and a second liquid crystal mask (42), a second polarizing filter (52) and a second lens (62) provided in the second partial optical path (S2). In this automobile headlight, the first lens in the first partial optical path (S1) has a different focal length f1 than the second lens (62) in the second partial optical path (S2) has.

However, in the case where the light emitted from the above-mentioned light source is separated into light of two polarization components and the light of each polarization component is controlled and used by the liquid crystal element, the liquid crystal element and a projection lens corresponding to the light of each polarization component are required. In this case, the number of components increases, the structure becomes complicated, and the lamp unit becomes large.

Further, only by increasing the number of light sources, it is not possible to collect light of two polarization components on one liquid crystal element, and it is necessary to add both a function of collecting light from the light source and a function of causing light of two polarization components to enter the liquid crystal element.

SUMMARY

The present invention has been devised in view of these and other problems and features in association with the conventional art. According to an aspect of the present invention, a vehicular lamp can have high light utilization efficiency and can be further miniaturized by reducing the number of parts and simplifying the structure.

According to still another aspect, a vehicular lamp can include: a light source configured to emit light; a projection optical system configured to project light emitted from the light source forward; a liquid crystal element which is arranged at a rear focal point of the projection optical system and configured to control an image of the light projected by the projection optical system; a first polarizing plate (10) which is disposed in an optical path between the liquid crystal element and the projection optical system and configured to transmit light of a specific polarization component; a condensing optical system configured to condense the light emitted from the light source toward the liquid crystal element; a polarizing beam splitter configured to transmit first light including one polarization component of the light emitted from the light source and reflect and separate second light including the other polarization component of the light emitted from the light source; a reflecting optical system configured to reflect the first light toward the liquid crystal element; and a polarization rotation element which is disposed in an optical path between the polarizing beam splitter and the liquid crystal element, and configured to rotate a polarization direction of one of the first light and the second light so that it coincides with the other light in terms of a polarization direction thereof.

In the vehicular lamp according to the foregoing aspect, the first light and the second light may be condensed at a shared condensing point. In this case, the liquid crystal element may be located at the shared condensing point.

In the vehicular lamp according to any of the foregoing aspects, the condensing optical system may be a first reflector having a concave elliptical reflection surface having a first focal point located at or substantially at the light source and a second focal point, the first reflector may be configured to reflect light from the light source to the second focal point while focusing the light toward the second focal point, and the polarizing beam splitter may be configured to reflect the second light so that the condensing point of the second light coincides with the rear focal point of the projection optical system.

Alternatively in the vehicular lamp according to any of the foregoing aspects, the condensing optical system may be a condenser lens disposed in an optical path between the light source and the polarizing beam splitter. In these cases, the reflecting optical system may be a second reflector having a convex hyperbolic reflection surface, and the second reflector may be configured to reflect the first light by the hyperbolic reflection surface so that the condensing point of the first light coincides with the rear focal point of the projection optical system.

In the vehicular lamp according to any of the foregoing aspects, the polarization rotation element may be a ½ wave plate.

The vehicular lamp according to any of the foregoing aspects may further include a second polarizing plate which is disposed in an optical path of the first light and the second light to enter the liquid crystal element and configured to transmit lights whose polarization directions coincide with each other out of the first light and the second light.

The vehicular lamp according to any of the foregoing aspects may further include a plurality of the light sources, and a plurality of the condensing optical systems provided corresponding to the respective light sources, and the plurality of condensing optical systems may condense light emitted from the respective light sources toward focal points in coincidence with each other.

As described above, according to the present invention, it is possible to provide a vehicular lamp which has high light utilization efficiency and can be further miniaturized by reducing the number of parts and simplifying the structure.

BRIEF DESCRIPTION OF DRAWINGS

These and other characteristics, features, and advantages of the present invention will become clear from the following description with reference to the accompanying drawings, wherein:

FIG. 11 is a schematic view illustrating an optical path of light in the lamp unit illustrated in FIG. 6; and FIG. 12 is a schematic diagram illustrating a configuration of a lamp unit included in a vehicular lamp according to a third exemplary embodiment of the present invention and a light path of the lamp unit.

DESCRIPTION OF EXEMPLARY EMBODIMENTS

A description will now be made below to vehicular lamps of the present invention with reference to the accompanying drawings in accordance with exemplary embodiments.

In the accompanying drawings, the XYZ orthogonal coordinate system is set, and the X-axis direction is indicated as the front-rear direction (lengthwise direction) of the vehicular lamp, the Y-axis direction is indicated as the left-right direction (widthwise direction) of the vehicular lamp, and the Z-axis direction is indicated as the vertical direction (height direction) of the vehicular lamp.

First Exemplary Embodiment

First, as a first exemplary embodiment of the present disclosure, for example, a vehicular lamp 1A illustrated in FIGS. 1 to 5 will be described.

Figure 1:
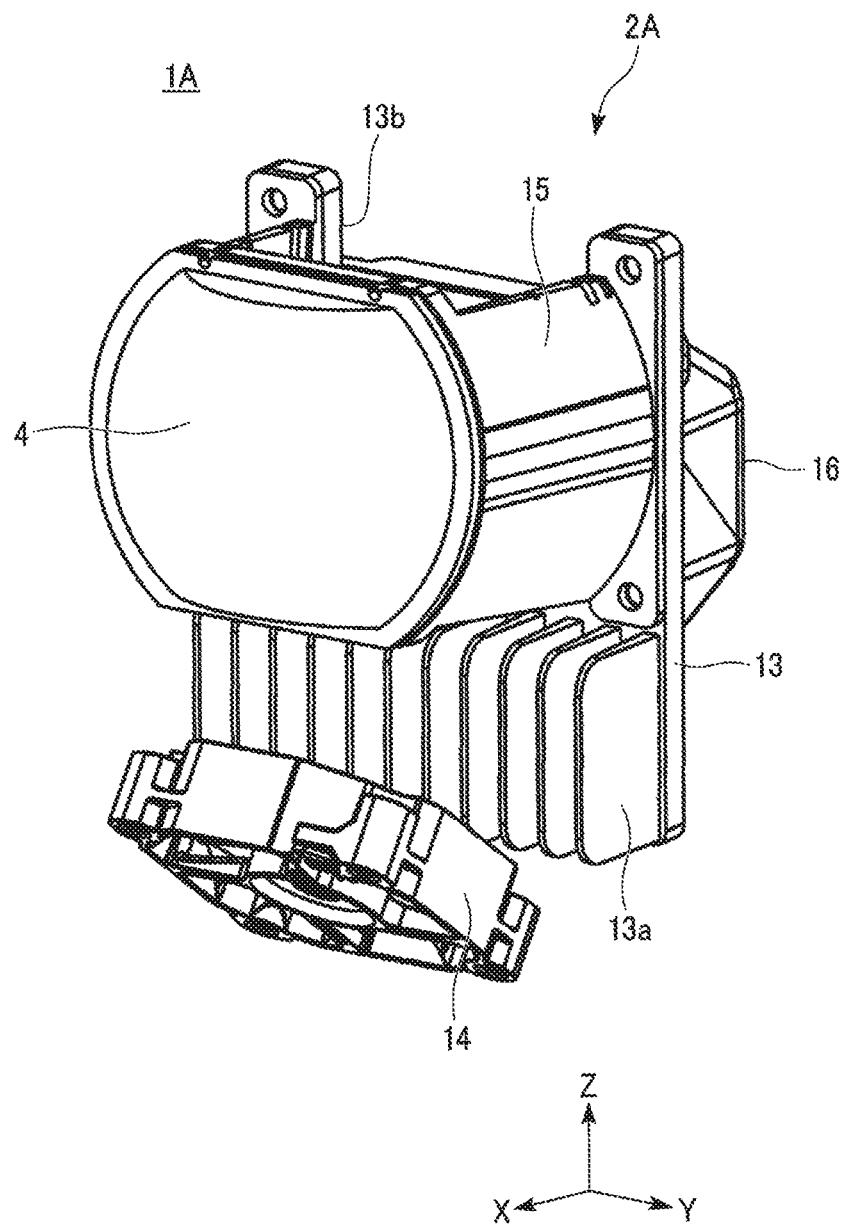
FIG. 1 is a perspective view of a lamp unit included in a vehicular lamp according to a first exemplary embodiment made in accordance with principles of the present invention, as seen from the front side.
Figure 2:
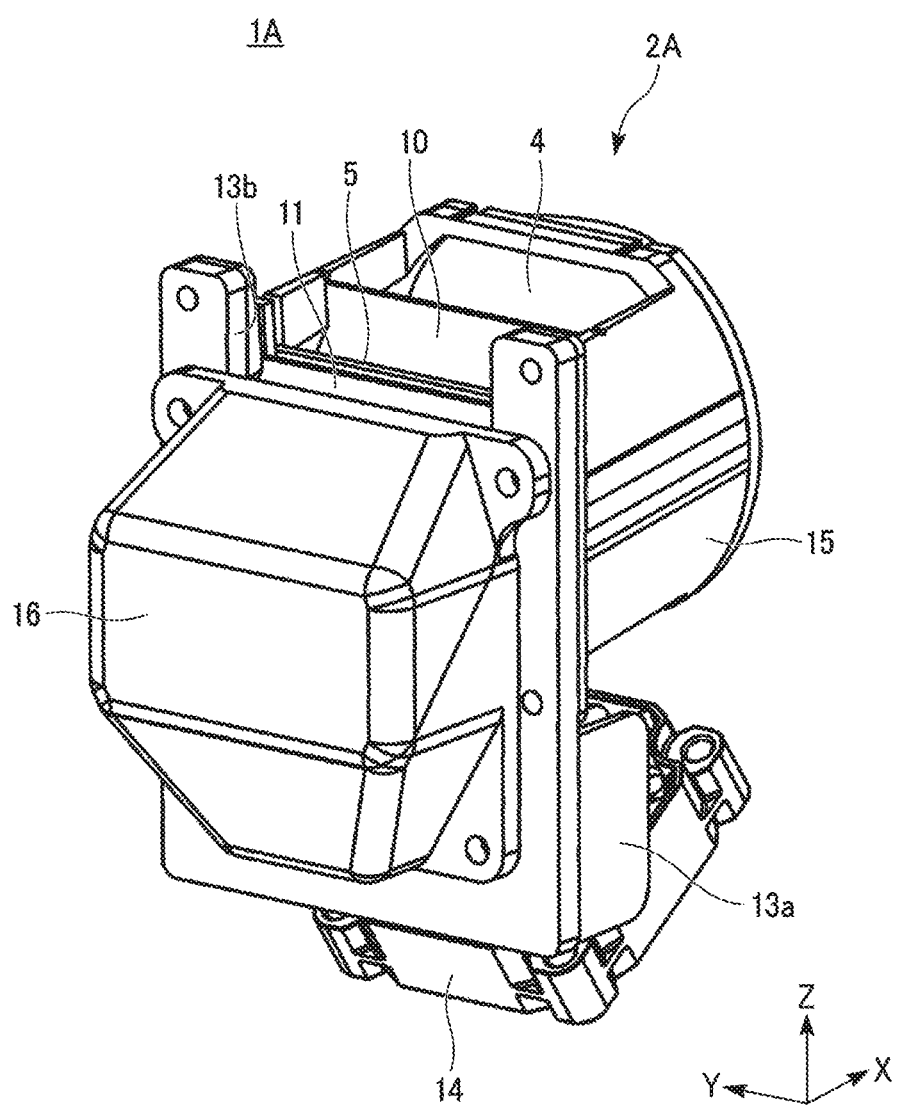
FIG. 2 is a perspective view of the lamp unit illustrated in FIG. 1, as seen from the rear side.
Figure 3:
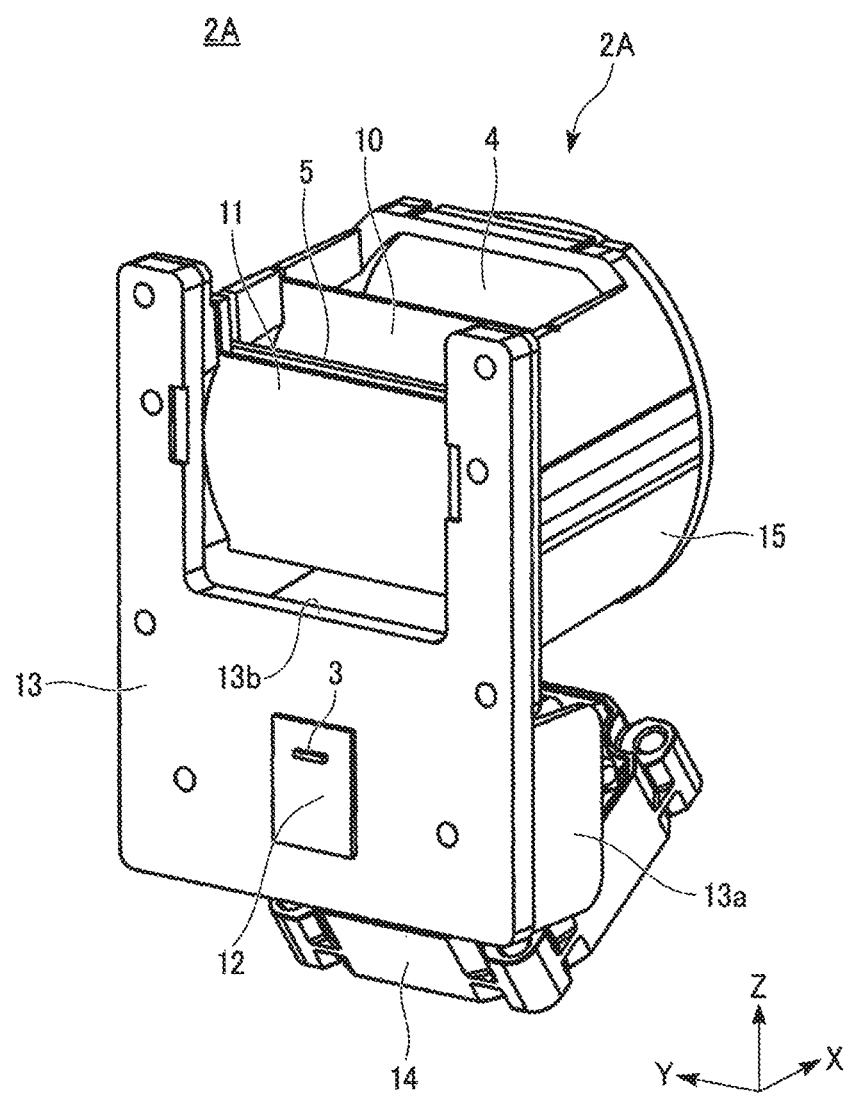
FIG. 3 is a perspective view of the lamp unit illustrated in FIG. 1 as seen from the rear side, with a reflector unit removed.
Figure 4:
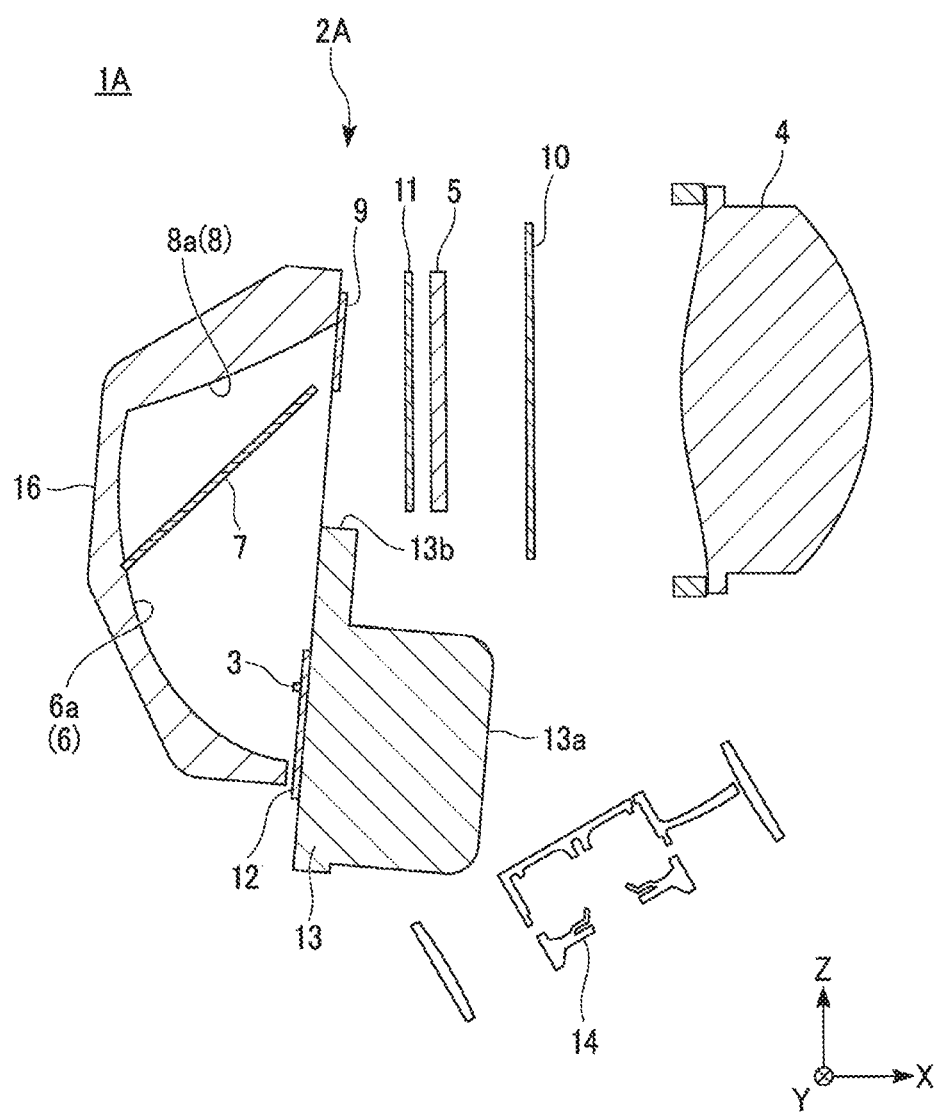
FIG. 4 is a cross-sectional view illustrating a configuration of the lamp unit illustrated in FIG. 1.
Figure 5:
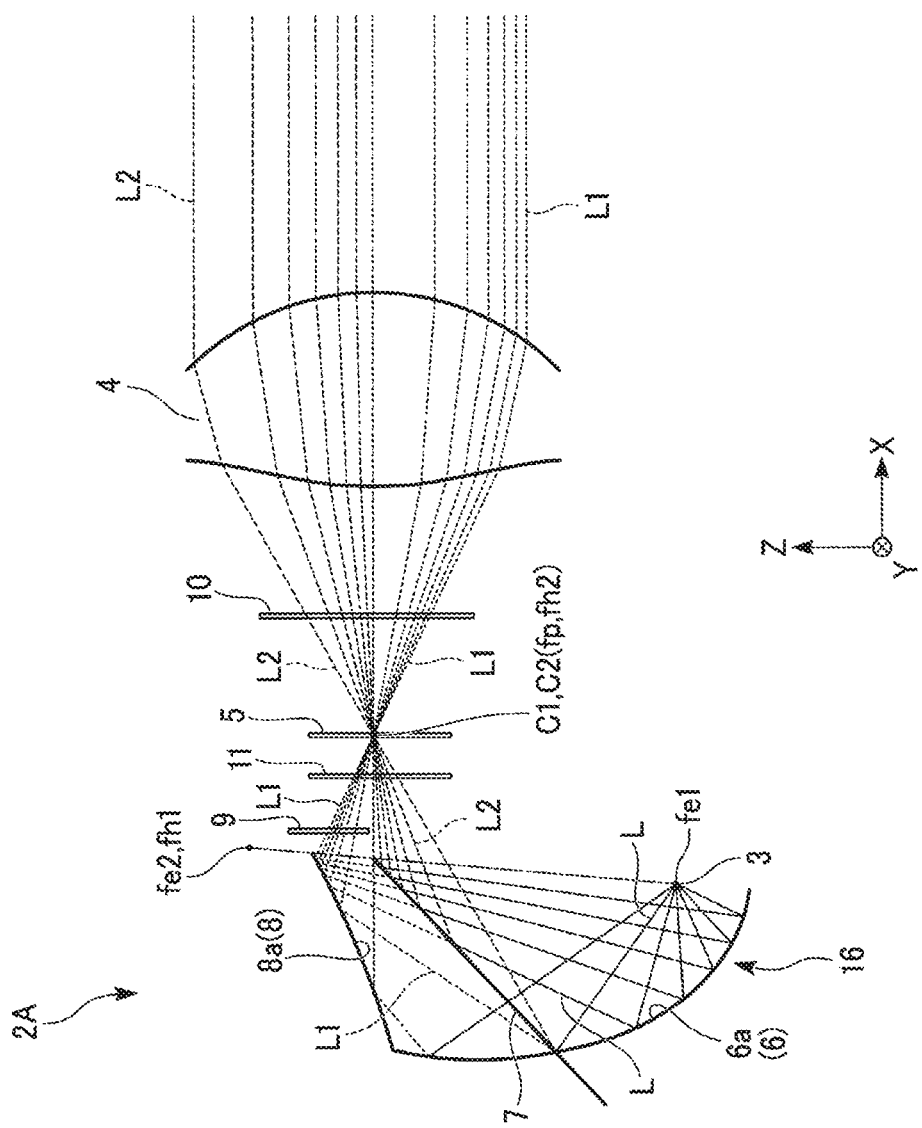
FIG. 5 is a schematic view illustrating an optical path of light in the lamp unit illustrated in FIG. 1.

FIG. 1 is a front perspective view of a lamp unit 2A included in the vehicular lamp 1A as seen from the front side. FIG. 2 is a perspective view of the lamp unit 2A as seen from the rear side. FIG. 3 is a perspective view of the lamp unit 2A, as seen from the rear side, with a reflector unit 16 removed. FIG. 4 is a cross-sectional view illustrating a configuration of the lamp unit 2A. FIG. 5 is a schematic diagram illustrating an optical path of light in the lamp unit 2A.

In the vehicular lamp 1A of the present exemplary embodiment, for example, the present invention can be applied to a variable light distribution headlight (ADB) configured to variably control light distribution patterns to be projected toward the front of a vehicle body as a vehicular headlight (headlamp) mounted on the front of the vehicle body.

Specifically, the vehicular lamp 1A includes the lamp unit 2A. The vehicular lamp 1A has a structure in which the lamp unit 2A is disposed inside a lamp body composed of a housing having an open front surface (not shown) and a transparent lens cover configured to cover the opening of the housing.

The lamp unit 2A of the present exemplary embodiment generally may include a light source 3, a projecting optical system 4, a liquid crystal element 5, a condensing optical system 6, a polarizing beam splitter 7, a reflecting optical system 8, a polarization rotation element 9, a first polarizing plate 10, and a second polarizing plate 11.

The light source 3 can emit unpolarized light L. In the present exemplary embodiment, the light source 3 may adopt a light-emitting element such as a light-emitting diode (LED) that emits white light, for example. In addition, LEDs of a high output (high luminance) type for vehicle lighting may preferably be used. The light source 3 can emit the light L emitted by the LED radially toward the rear side (−X axis direction) in a state in which the LED is mounted on one surface (in this exemplary embodiment, the rear surface) of a mounting board 12.

As the light source 3, a light-emitting element such as a laser diode (LD) may be used other than the above-described LED. In addition, a light source other than the above-described light-emitting element may be used. Further, the number of light-emitting elements is not limited to one, and may be two or more.

The mounting board 12 may be formed of a rectangular printed wiring board on at least one surface of which wiring (not shown) electrically connected to the above-mentioned LED (light source 3) is provided. When the light source 3 includes a plurality of LEDs, the plurality of LEDs may be mounted in a state in which they are arranged at equal intervals in the widthwise direction of the mounting board 12.

In the lamp unit 2A of the present exemplary embodiment, although not shown, the mounting board 12 on which the above-mentioned LED (light source 3) has been mounted and a circuit board on which an LED driving circuit for driving the LED (light source 3) is provided are separately arranged, and the mounting board and the circuit board are electrically connected to each other via wiring cords called harnesses. As a result, the LED driving circuit is protected from the heat generated by the LED (light source 3).

The lamp unit 2A of the present exemplary embodiment includes a heat sink 13 in which a plurality of heat dissipation fins 13a for dissipating heat generated by the light source 3 are provided on the front surface side, and a cooling fan 14 disposed on the front surface side of the heat sink 13.

The mounting board 12 is attached to a position opposite to the heat dissipation fins 13a on the rear surface side of the heat sink 13 by screwing or the like. Alternatively, the mounting board 12 may be attached to the heat sink 13 via a heat transfer member such as a heat conduction grease.

The heat sink 13 is formed, at least partially or entirely, of a metal material such as aluminum, copper, or the like having high thermal conductivity, a resin material, a composite material of these, or the like. The cooling fan 14 blows air toward the heat dissipation fins 13a. As a result, it is possible to efficiently dissipate heat transferred from the light source 3 to the heat sink 13 to the outside.

The projection optical system 4 is composed of at least one or a plurality of (one in this exemplary embodiment) lenses (hereinafter, referred to as a projection lens 4) configured to project the light L emitted from the light source 3 toward the front (+X axis direction). The projection lens 4 is disposed on the front side of the liquid crystal element 5 while being held by a holder 15. The holder 15 is attached to the front side of the heat sink 13 positioned above the heat dissipation fins 13a by screwing or the like. On the other hand, the heat sink 13 is provided with a notched portion 13b which is notched so as to face the projection lens 4 (see FIGS. 3 and 4).

The liquid crystal element 5 is formed of a light transmissive liquid crystal panel (LCD). The projection lens 4 has a rear focal point fp, and the liquid crystal element 5 is arranged in coincidence with the rear focal point fp of the projection lens 4. That is, the liquid crystal element 5 is located at or near the rear focal point fp of the projection lens 4. In the lamp unit 2A of the present exemplary embodiment, the liquid crystal element 5 is held inside the holder 15.

The drive voltage applied between the electrodes is controlled by a liquid crystal drive circuit (not shown), so that the liquid crystal element 5 controls the image (light distribution pattern) of first light L1 and second light L2 projected by the projection lens 4 while modulating the light (the first light L1 and the second light L2 to be described later) passing therethrough.

The liquid crystal element 5 may be of a segment type in which light modulation is switched by controlling a drive voltage applied between electrodes in one segment, or may be of a dot matrix type in which light modulation is switched in an arbitrary area by controlling a drive voltage applied between electrodes of dots (pixels) arranged in a matrix.

The condensing optical system 6 includes a first reflector (hereinafter, called as the first reflector 6) configured to condense the light L emitted from the light source 3 toward the liquid crystal element 5. The first reflector 6 has a concave elliptical reflecting surface 6a formed such that its cross-sectional shape describes an elliptical line having two focal points fe1 and fe2. The first focal point fe1 of the elliptical reflecting surface 6a coincides with the position of the light source 3. As a result, the first reflector 6 reflects the light L from the light source 3 disposed in coincidence with the first focal point fe1 of the elliptical reflection surface 6a while focusing the light L toward the second focal point fe2 of the elliptical reflection surface 6a.

The polarizing beam splitter 7 separates the light L emitted from the light source 3 into the first light L1 containing one polarization component (e.g., P-polarization component) and the second light L2 containing the other polarization component (e.g., S-polarization component). The polarizing beam splitter 7 is disposed in an optical path between the condensing optical system (the first reflector) 6 and the reflecting optical system (second reflector, which will be described later) 8.

As the polarizing beam splitter 7, for example, a wire grid method, an optical multilayer film, or the like can be used. The polarizing beam splitter 7 is not limited to those of a plate type having a flat plate shape, and may be those of a cube type in which two rectangular prisms are combined.

The polarizing beam splitter 7 transmits the first light L1 of the light L emitted from the light source 3 toward the upper side (+Z axis direction) while reflecting the second light L2 toward the front side (+X axis direction). The polarizing beam splitter 7 reflects the second light L2 so that the condensing point C2 of the second light L2 coincides with the rear focal point fp of the projection lens 4.

The reflecting optical system 8 is constituted by a second reflector (hereinafter referred to as a second reflector 8) that reflects the first light L1 toward the liquid crystal element 5. The second reflector 8 has a convex hyperbolic reflecting surface 8a whose cross-sectional shape is formed to draw a hyperbola having two focal points fh1 and fh2. The hyperbolic reflecting surface 8a has its first focal point fh1 in coincidence with the second focal point fe2 of the elliptical reflecting surface 6a, and its second focal point fh2 in coincidence with the rear focal point fp of the projection lens 4. As a result, the second reflector 8 is configured to reflect the first light L1 by the hyperbolic reflecting surface 8a so that the condensing point C1 of the first light L1 coincides with the rear focal point fp of the projection lens 4.

Herein, the lamp unit 2A of the present exemplary embodiment includes a reflector unit 16 in which the first reflector 6 and the second reflector 8 are integrally formed. The reflector unit 16 is formed of, for example, a resin material. On the other hand, the elliptical reflection surface 6a and the hyperbolic reflection surface 8a are formed of a metallic reflection film having a high reflectance, for example, a metal alloy deposited by evaporation of an aluminum alloy or the like.

In the lamp unit 2A of the present exemplary embodiment, the reflector unit 16 is attached to the rear surface of the heat sink 13 by screwing or the like while the polarizing beam splitter 7 is held inside the reflector unit 16.

The polarization rotation element 9 is composed of a half wavelength ($\lambda/2$) plate disposed in an optical path between the polarizing beam splitter 7 and the liquid crystal element 5. In the lamp unit 2A of the present exemplary embodiment, the polarization rotation element 9 is attached to the front surface of the reflector unit 16 described above.

The polarization rotation element 9 rotates the polarization direction of one of the first light L1 and the second light L2 (in the present exemplary embodiment, the first light L1), and transmits the light toward the liquid crystal element 5 in a state in which the polarization direction of the one light (first light L1) is made coincide with the polarization direction of the other light (in the present exemplary embodiment, the second light L2).

Therefore, in the present exemplary embodiment, the $\lambda/2$ plate (polarization rotation element 9) is disposed in the optical path of the first light L1 between the second reflector 8 and the liquid crystal element 5. The $\lambda/2$ plate converts the polarization direction of the first light L1 from P-polarized light to S-polarized light. This makes it possible to match the polarization directions of the first light L1 and the second light L2 with each other.

On the other hand, when the polarization direction of the second light L2 is rotated to coincide with the polarization direction of the first light L1, a λ/2 plate (polarization rotation element 9) only needs to be disposed in the optical path of the second light L2 between the polarizing beam splitter 7 and the liquid crystal element 5. In this case, it is possible to convert the polarization direction of the second light L2 from S-polarized light to P-polarized light by the λ/2 plate, so as to match the polarization directions of the first light L1 and the second light L2 with each other.

As the polarization rotation element 9, for example, an optical element configured to rotate the polarization direction such as a Faraday element or a liquid crystal element can be used other than the above-mentioned retardation plate such as λ/2 plate.

The first polarizing plate 10 is disposed in an optical path between the liquid crystal element 5 and the projection lens 4. In the lamp unit 2A of the present exemplary embodiment, the first polarizing plate 10 is held inside the holder 15.

The first polarizing plate 10 transmits light of a specific polarization component out of the first light L1 and the second light L2 having been modulated by the liquid crystal element 5. That is, the first polarizing plate 10 transmits the light of the polarization component corresponding to the light distribution pattern of the light controlled by the liquid crystal element 5, and blocks the light of the other polarization components. By doing so, the first light L and the second light L2 having been modulated by the liquid crystal element 5 can be selectively caused to transmit in accordance with the light distribution pattern of the light controlled by the liquid crystal element 5.

The second polarizing plate 11 is disposed in the optical paths of the first light L1 and the second light L2 that enter the liquid crystal element 5. In the lamp unit 2A of the present exemplary embodiment, the second polarizing plate 11 is held inside the holder 15.

The second polarizing plate 11 transmits the light of the polarization component (S-polarized light in this exemplary embodiment) having the same polarization direction out of the first light L1 and the second light L2, and blocks the light of the other polarization components. Thus, the degree of polarization of the first light L1 and the second light L2 that enter the liquid crystal element 5 can be improved. As a result, it is possible to improve the contrast of the light distribution pattern of the light controlled by the liquid crystal element 5.

In the lamp unit 2A of the present exemplary embodiment, since the polarization directions of the first light L1 and the second light L2 entering the liquid crystal element 5 can be matched with each other by the above-described polarization rotation element 9, the second polarizing plate 11 can be omitted in some cases.

Further, since the first polarizing plate 10 and the second polarizing plate 11 described above generate heat by blocking (absorbing) light, it is preferable that they are disposed separately from the liquid crystal element 5.

In the vehicular lamp 1A of the present exemplary embodiment having the above-described configuration, the control circuit unit (not shown) calculates the region to be shielded by judging the surrounding information of a preceding vehicle, an oncoming vehicle, or the like using images obtained from cameras provided in the vehicle body and information of various sensors provided in the vehicle body, and transmits the information of the region to be shielded to the liquid crystal drive circuit as a control signal.

The liquid crystal driving circuit controls the image (light distribution pattern) of the light L1 and light L2 projected by the projection lens 4 while controlling the driving of the liquid crystal element 5 on the basis of the control signal from the control circuit unit. As a result, it is possible to variably control the light distribution patterns of the light L1 and light L2 projected from the projection lens 4 toward the front of the vehicle body.

In other words, the vehicular lamp 1A of the present exemplary embodiment serving as ADB can enlarge the driver's field of front vision at night by recognizing the surrounding conditions of a preceding vehicle, an oncoming vehicle, and the like with the in-vehicle cameras and the like, and shielding light that may give glare to the preceding vehicle, the oncoming vehicle, and the like.

In the lamp unit 2A of the present exemplary embodiment, the light L emitted from the light source 3 can be reflected while being condensed toward the liquid crystal element 5 by the first reflector 6 (elliptical reflecting surface 6a). Furthermore, the light L emitted from the light source 3 can be separated into the first light L1 including one polarization component having transmitted through the polarizing beam splitter 7 and the second light L2 including the other polarization component reflected by the polarizing beam splitter 7.

Of these, the first light L1 is reflected toward the liquid crystal element 5 by the second reflector 8 (hyperbolic reflective surface 8a). On the other hand, the second light L2 is reflected toward the liquid crystal element 5 by the polarizing beam splitter 7. In addition, the first light L and the second light L2 enter the liquid crystal element 5 in a state in which the polarization directions of the first light L1 and the second light L2 are matched (in coincidence) with each other by the polarizing rotation element 9 and the second polarizing plate 11.

Herein, the first reflector 6 reflects the light L from the light source 3 disposed in coincidence with the first focal point fe1 of the elliptical reflection surface 6a while condensing the light L toward the second focal point fe2 of the elliptical reflection surface 6a. On the other hand, since the second reflector 8 has the hyperbolic reflecting surface 8a with the first focal point fh1 in coincidence with the second focal point fe2 of the elliptical reflecting surface 6a, and the second focal point fh2 in coincidence with the rear focal point fp of the projection lens 4, the second reflector 8 can reflect the first light L1 while condensing toward the second focal point fh2 of the hyperbolic reflecting surface 8a.

As a result, the second reflector 8 reflects the first light L1 so that the condensing point C1 of the first light L1 coincides with the rear focal point fp of the projection lens 4. On the other hand, the polarizing beam splitter 7 reflects the second light L2 so that the condensing point C2 of the second light L2 coincides with the rear focal point fp of the projection lens 4.

Therefore, in the lamp unit 2A of the present exemplary embodiment, the first light L1 and the second light L2 are condensed at the shared condensing points C1 and C2, i.e., the rear focal point fp of the projector lens 4. Accordingly, without increasing the number of the light sources 3, the light of the two polarization components separated by the polarizing beam splitter 7, i.e., the first light L1 and the second light L2, can be condensed on one liquid crystal element 5, and the utilization efficiency of the light L emitted from the light source 3 can be increased.

Further, in the lamp unit 2A of the present exemplary embodiment, the liquid crystal element 5 is located at the shared condensing points C1 and C2, i.e., the rear focal point fp of the projection lens 4. Thus, the polarization directions of the first light L and the second light L2 that enter the liquid crystal element 5 can be made coincide with each other more properly. As a result, it is possible to reduce the influence of the viewing angle dependency of the liquid crystal element 5 and to increase the amount of light L1 and light L2 having transmitted through the liquid crystal element 5 and entering the projection lens 4.

Therefore, in the lamp unit 2A of the present exemplary embodiment, the luminous intensity of the light distribution patterns of the light L1 and light L2 projected from the projection lens 4 toward the front of the vehicle body can be increased. As a result, visibility in front of the vehicle body, particularly in a farther area, can be enhanced, and safety can be further improved.

Further, in the lamp unit 2A of the present exemplary embodiment, there is no need to separately use liquid crystal elements 5, projection lenses 4, and the like for the respective two polarization components separated by the polarizing beam splitters 7, rather these components can be commonly used. As a result, the number of components constituting the lamp unit 2A can be reduced and the structure can be simplified, and thus the lamp unit 2A can be further downsized and lightened.

As described above, in the vehicular lamp 1A of the present exemplary embodiment, the provision of the above-described lamp unit 2A can improve the utilization efficiency of the light emitted from the light source 3, and the reduced number of components and simplified structure can further downsize and lighten the entire lamp unit 2A.

Second Exemplary Embodiment

Next, as a second exemplary embodiment of the present invention, a vehicular lamp 1B illustrated in FIGS. 6 to 11 will be described.

Figure 6:
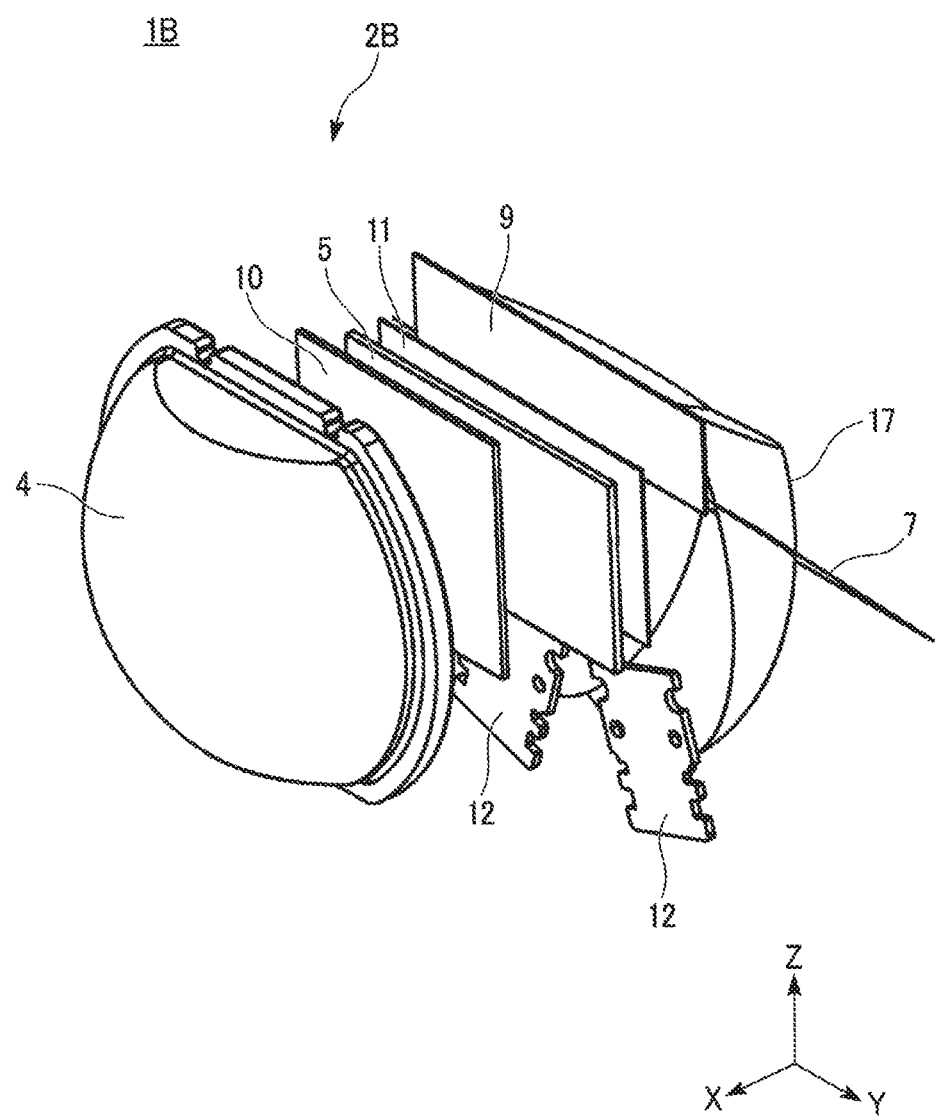
FIG. 6 is a perspective view of a lamp unit included in a vehicular lamp according to a second exemplary embodiment of the present invention, as seen from the front side.
Figure 7:
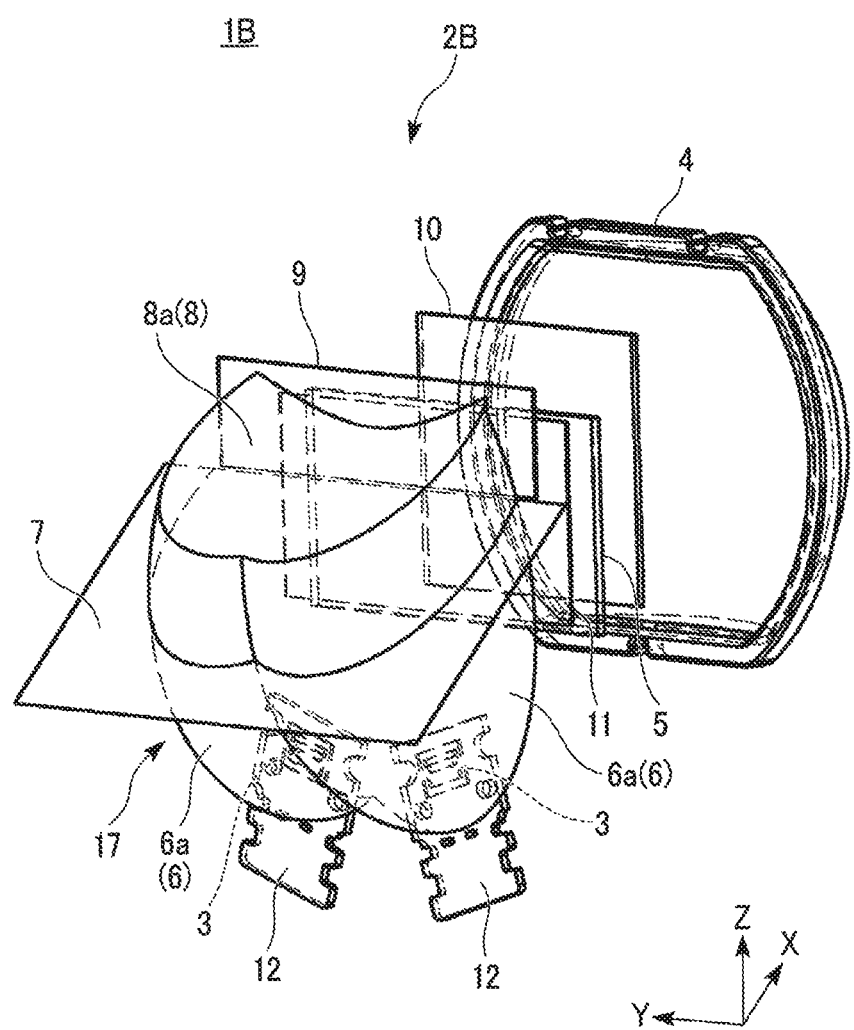
FIG. 7 is a perspective view of the lamp unit illustrated in FIG. 6, as seen from the rear side.
Figure 8:
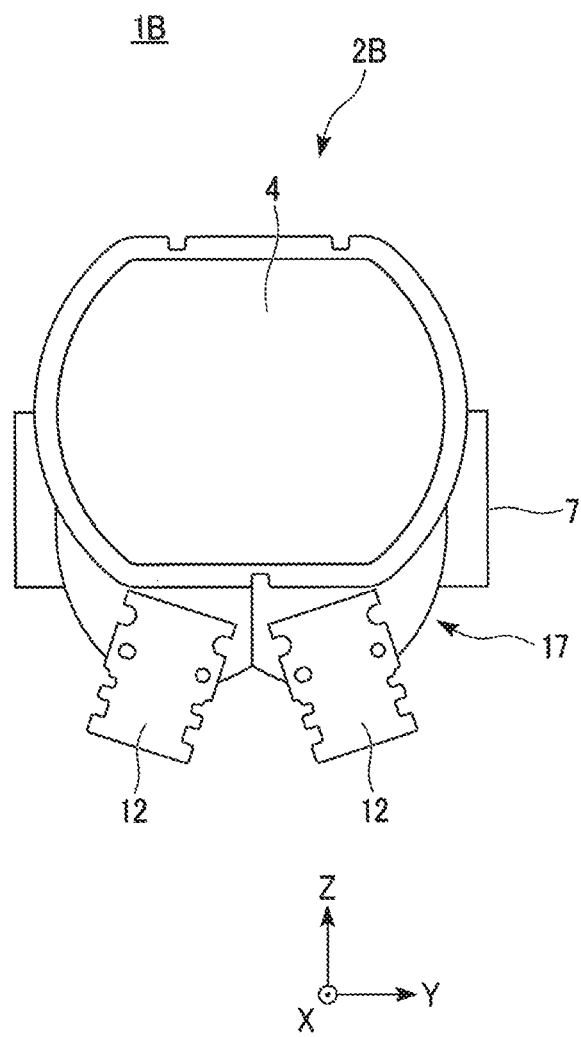
FIG. 8 is a front view illustrating a structure of the lamp unit illustrated in FIG. 6.
Figure 9:
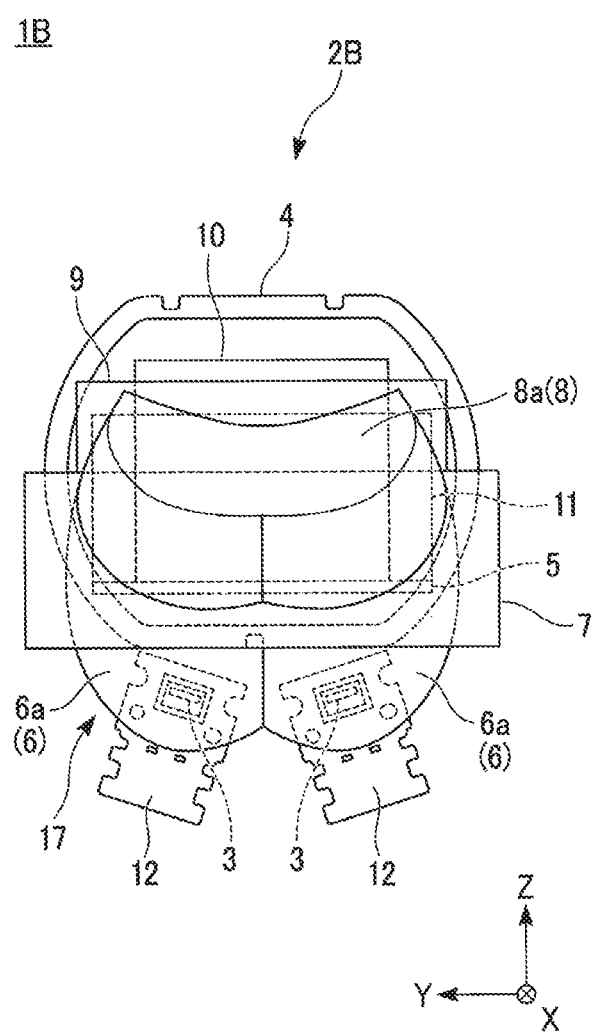
FIG. 9 is a rear view illustrating a configuration of the lamp unit illustrated in FIG. 6.
Figure 10:
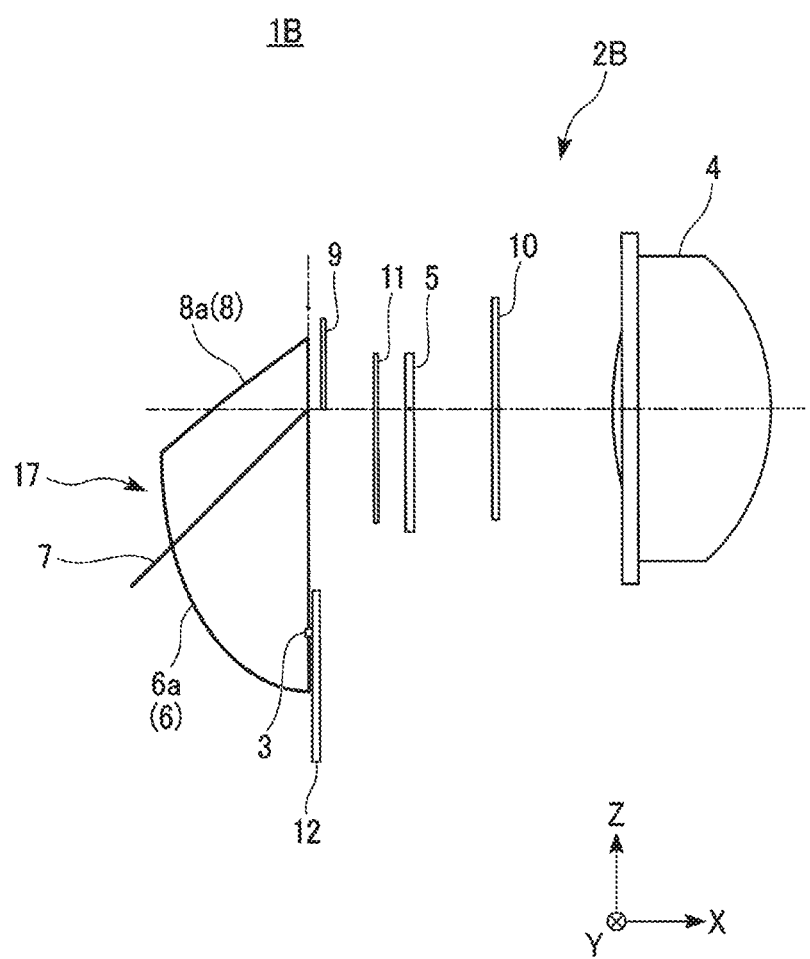
FIG. 10 is a side view illustrating the configuration of the lamp unit illustrated in FIG. 6.

FIG. 6 is a perspective view of a lamp unit 2B of the vehicular lamp 1B, as seen from the front side. FIG. 7 is a perspective view of the lamp unit 2B, as seen from the rear side. FIG. 8 is a front view illustrating the configuration of the lamp unit 2B. FIG. 9 is a rear view illustrating the configuration of the lamp unit 2B. FIG. 10 is a side view illustrating the configuration of the lamp unit 2B. FIG. 11 is a schematic diagram illustrating an optical path of light in the lamp unit 2B. In the following description, the same reference numerals are assigned to the same parts as those of the vehicular lamp 1A (lamp unit 2A) in the drawings, and the description thereof will be omitted.

The vehicular lamp 1B of the present exemplary embodiment includes the lamp unit 2B. The vehicular lamp 1B has a structure in which the lamp unit 2B is disposed inside a lamp body composed of a housing having an opening at its front surface (not shown) and a transparent lens cover covering the opening of the housing.

The lamp unit 2B of the present exemplary embodiment includes a plurality of (two in the present exemplary embodiment) light sources 3 and a plurality of (two in the present exemplary embodiment) first reflectors 6 corresponding to the plurality of light sources 3, respectively.

The lamp unit 2B of the present exemplary embodiment includes a reflector unit 17 in which the plurality of first reflectors 6, the polarizing beam splitter 7, and the second reflector 8 are integrally formed. As to the other components, the lamp unit 2B generally includes the projection lens (projection optical system) 4, the liquid crystal element 5, the polarization rotation element 9, the first polarizing plate 10, and the second polarizing plate 11 similarly to the lamp unit 2A described above.

In the lamp unit 2B, a plurality of (two in this embodiment) mounting boards 12 on which the light sources 3 are mounted are attached to the above-described heat sinks 13 (not shown in FIGS. 6 to 11) on the rear surface side thereof by screwing or the like.

The plurality of first reflectors 6 reflect the light L from the respective light sources 3 arranged in coincidence with the first focal point fe1 of each of the elliptical reflective surfaces 6a while being condensed toward the second focal point fe2 of each of the elliptical reflective surfaces 6a. The second focal points fe2 of the elliptical reflecting surfaces 6a of the first reflectors 6 are located at the same position in terms of optical design. Therefore, the plurality of first reflectors 6 condense the light L emitted from the plurality of light sources 3 toward the mutually coincident focal point, i.e., the second focal point fe2.

On the other hand, the second reflector 8 has the hyperbolic reflecting surface 8a with the first focal point fh1 that coincides with the shared second focal point fe2 of the elliptical reflecting surfaces 6a of the respective first reflectors 6, and the second focal point fh2 that coincides with the rear focal point fp of the projecting lens 4, so that the first light L1 is reflected while being condensed toward the second focal point fh2 of the hyperbolic reflecting surface 8a.

As a result, the second reflector 8 reflects the first light L1 so that the condensing point C1 of the first light L1 coincides with the rear focal point fp of the projection lens 4. On the other hand, the polarizing beam splitter 7 reflects the second light L2 so that the condensing point C2 of the second light L2 coincides with the rear focal point fp of the projection lens 4.

Therefore, in the lamp unit 2B of the present exemplary embodiment, the first light L1 and the second light L2 separated by the polarizing beam splitter 7 out of the light L emitted from the plurality of light sources 3 described above are condensed at the mutually shared condensing points C1 and C2 (the rear focal point fp of the projection lens 4). As a result, even when the number of the light sources 3 is increased, the light of the two polarization components separated by the polarizing beam splitter 7, i.e., the first light L1 and the second light L2, can be condensed on the single liquid crystal element 5, and the utilization efficiency of the light L emitted from the plurality of light sources 3 can be increased.

Further, in the lamp unit 2B of the present exemplary embodiment, the liquid crystal element 5 is located at the shared condensing points C1 and C2, i.e., the rear focal point fp of the projection lens 4. As a result, the polarization directions of the first light L1 and the second light L2 that enter the liquid crystal element 5 can be made coincide with each other more properly. As a result, it is possible to reduce the influence of the viewing angle dependency of the liquid crystal element 5 and to increase the amount of light L and light L2 having transmitted through the liquid crystal element 5 and entering the projection lens 4.

Therefore, in the lamp unit 2B of the present exemplary embodiment, even when a plurality of light sources 3 are used, the luminous intensity of the light distribution patterns of the light L1 and light L2 projected from the projection lens 4 toward the front of the vehicle body can be increased.

As a result, visibility in front of the vehicle body, particularly in the farther area, can be enhanced, and safety can be further improved.

In the lamp unit 2B of the present exemplary embodiment, when the plurality of light sources 3 are used, components such as the polarizing beam splitter 7, the second reflector 8, the liquid crystal element 5, and the projection lens 4 can be commonly used (shared). Thus, even when a plurality of light sources 3 are used, the number of components constituting the lamp unit 2B can be reduced and the structure can be simplified, and the lamp unit 2B can be further reduced in size and weight.

As described above, in the vehicular lamp 1B of the present exemplary embodiment, the provision of the above-described lamp unit 2B can improve the utilization efficiency of the light emitted from the plurality of light sources 3, and the reduced number of components and simplified structure can further downsize and lighten the lamp unit 2B.

Third Exemplary Embodiment

Next, as a third exemplary embodiment of the present invention, a vehicular lamp 1C illustrated in FIG. 12 will be described. FIG. 12 is a schematic view illustrating the configuration of the lamp unit 1C included in the vehicular lamp 1C and the optical path of the light. In the following description, the same reference numerals are assigned to the same parts as those of the vehicular lamp 1A (lamp unit 2A) in the drawings, and the description thereof will be omitted.

The vehicular lamp 1C of the present exemplary embodiment includes the lamp unit 2C. The vehicular lamp 1C has a structure in which the lamp unit 2C is disposed inside a lamp body composed of a housing having an opening at its front surface (not shown) and a transparent lens cover covering the opening of the housing.

The lamp unit 2C of the present exemplary embodiment includes, as a condensing optical system, a condenser lens 18 instead of the first reflector 6. The condenser lens 18 is composed of at least one or a plurality of lenses (in this embodiment, a single lens) configured to condense the light L emitted from the light source 3 toward the liquid crystal element 5. The condenser lens 18 is disposed in the optical path between the light source 3 and the polarizing beam splitter 7. The other components and configuration are the same as those of the lamp unit 2A.

In the lamp unit 2C of the present exemplary embodiment having the above-described configuration, the light L emitted from the light source 3 is condensed toward the liquid crystal element 5 by the condenser lens 18. The light L emitted from the light source 3 is separated into first light L1 including one polarization component having transmitted through the polarizing beam splitter 7 and second light L2 including the other polarization component reflected by the polarizing beam splitter 7.

Of these, the first light L1 is reflected toward the liquid crystal element 5 by the second reflector 8 (hyperbolic reflective surface 8a). On the other hand, the second light L2 is reflected toward the liquid crystal element 5 by the polarizing beam splitter 7. Furthermore, the first light L1 and the second light L2 enter the liquid crystal element 5 in a state in which the polarization directions of the first light L1 and the second light L2 are matched (in coincidence) with each other by the polarizing rotation element 9 and the second polarizing plate 11.

Herein, the condenser lens 18 has a front focal point fc so as to condense the light L, emitted from the light source 3, toward the front focal point fc. On the other hand, since the second reflector 8 has the hyperbolic reflecting surface 8a with the first focal point fh1 in coincidence with the front focal point fc of the condenser lens 18, and the second focal point fh2 in coincidence with the rear focal point fp of the projection lens 4, the second reflector 8 can reflect the first light L1 while condensing toward the second focal point fh2 of the hyperbolic reflecting surface 8a.

As a result, the second reflector 8 reflects the first light L1 so that the condensing point C1 of the first light L1 coincides with the rear focal point fp of the projection lens 4. On the other hand, the polarizing beam splitter 7 reflects the second light L2 so that the condensing point C2 of the second light L2 coincides with the rear focal point fp of the projection lens 4.

Therefore, in the lamp unit 2C of the present exemplary embodiment, the first light L1 and the second light L2 are condensed at the shared condensing points C1 and C2, i.e., the rear focal point fp of the projector lens 4. Accordingly, without increasing the number of the light sources 3, the light of the two polarization components separated by the polarizing beam splitter 7, i.e., the first light L1 and the second light L2, can be condensed on one liquid crystal element 5, and the utilization efficiency of the light L emitted from the light source 3 can be increased.

Further, in the lamp unit 2C of the present exemplary embodiment, the liquid crystal element 5 is located at the shared condensing points C1 and C2, i.e., the rear focal point fp of the projection lens 4. Thus, the polarization directions of the first light L1 and the second light L2 that enter the liquid crystal element 5 can be made coincide with each other further more. As a result, it is possible to reduce the influence of the viewing angle dependency of the liquid crystal element 5 and to increase the amount of light L1 and light L2 having transmitted through the liquid crystal element 5 and entering the projection lens 4.

Therefore, in the lamp unit 2C of the present exemplary embodiment, the luminous intensity of the light distribution patterns of the light L1 and light L2 projected from the projection lens 4 toward the front of the vehicle body can be increased. As a result, visibility in front of the vehicle body, particularly in the farther area, can be enhanced, and safety can be further improved.

Further, in the lamp unit 2C of the present exemplary embodiment, there is no need to separately use liquid crystal element 5, projection lens 4, and the like for the respective two polarization components separated by the polarizing beam splitters 7, rather these components can be commonly used. As a result, the number of components constituting the lamp unit 2C can be reduced and the structure can be simplified, and thus the lamp unit 2C can be further downsized and lightened.

As described above, in the vehicular lamp 1C of the present exemplary embodiment, the provision of the above-described lamp unit 2C can improve the utilization efficiency of the light emitted from the light source 3, and the reduced number of components and simplified structure can further downsize and lighten the lamp unit 2C.

The present invention is not necessarily limited to the exemplary embodiments described above, and various modifications may be made without departing from the spirit of the present invention.

For example, in the above-describe exemplary embodiment, the polarizing beam splitter 7 is held inside the reflector units 16 and 17 in which the first reflector 6 and the second reflector 8 are integrally formed, but a light guide unit in which the first reflector 6 (elliptical reflection surface 6a), the second reflector 8 (hyperbolic reflection surface 8a), and the polarizing beam splitter 7 are integrally formed may be used.

Specifically, the light guide unit has a configuration in which the polarizing beam splitter 7 is disposed on the abutting surface of a light guiding body, and the elliptical reflection surface 6a and the hyperbolic reflection surface 8a are disposed on the outer peripheral surface of the light guiding body. In the light guide unit, the light L emitted from the light source 3 is guided inside the light guiding body, and the light of the two polarization components (the first light L1 and the second light L2) separated by the polarizing beam splitter 7 is reflected by the ellipsoidal reflection surface 6a and the hyperbolic reflection surface 8a. In this manner, the same (similar) configuration as that of the first reflector 6 (elliptical reflection surface 6a), the second reflector 8 (hyperbolic reflection surface 8a), and the polarizing beam splitter 7 can be obtained.

In the above-described exemplary embodiments, although the present invention is applied to the variable light distribution headlamp (ADB) described above, the present invention may also be applied to a variable light distribution headlamp (AFS: Adaptive Front-Lighting System) which ensures visibility in the vehicle traveling direction by controlling the liquid crystal element in accordance with the steering angle (turning angle) and the speed (vehicle speed) of the vehicle body traveling while turning so as to enlarge the illumination range of the passing beams in the vehicle traveling direction.

The present invention can also be applied to a bi-functional type vehicular lamp capable of switching a low-beam light distribution pattern including a cut-off line at the upper end as a passing beam (low beam) and a high-beam light distribution pattern positioned above the low-beam light distribution pattern as a traveling beam (high beam) by one lamp unit.

It will be apparent to those skilled in the art that various modifications and variations can be made in the present invention without departing from the spirit or scope of the present invention. Thus, it is intended that the present invention cover the modifications and variations of the present invention provided they come within the scope of the appended claims and their equivalents. All related art references described above are hereby incorporated in their entirety by reference.

What is claimed is:

1. A vehicular lamp comprising:
   a light source configured to emit light;
   a projection optical system configured to have a rear focal point in a rear thereof so as to project light emitted from the light source forward;
   a liquid crystal element which is arranged at the rear focal point of the projection optical system and configured to control an image of the light projected by the projection optical system;
   a first polarizing plate which is disposed in an optical path between the liquid crystal element and the projection optical system and configured to transmit light of a specific polarization component;
   a condensing optical system configured to condense the light emitted from the light source toward the liquid crystal element;
   a polarizing beam splitter configured to transmit first light including one polarization component of the light emitted from the light source and reflect and separate second light including the other polarization component of the light emitted from the light source;
   a reflecting optical system configured to reflect the first light toward the liquid crystal element; and
   a polarization rotation element which is disposed in an optical path between the polarizing beam splitter and the liquid crystal element, and configured to rotate a polarization direction of one of the first light and the second light so that it coincide with the other light in terms of a polarization direction thereof,
   wherein the condensing optical system is a first reflector having a concave elliptical reflection surface having a first focal point located at or substantially at the light source and a second focal point, the first reflector being configured to reflect light from the light source to the second focal point while focusing the light toward the second focal point, and
   wherein the polarizing beam splitter is configured to reflect the second light so that the condensing point of the second light coincides with the rear focal point of the projection optical system.

2. The vehicular lamp according to claim 1, wherein the first light and the second light are condensed at a shared condensing point.

3. The vehicular lamp according to claim 2, wherein the liquid crystal element is located at the shared condensing point.

4. The vehicular lamp according to claim 1, wherein
   the reflecting optical system is a second reflector having a convex hyperbolic reflection surface, and
   the second reflector is configured to reflect the first light by the hyperbolic reflection surface so that the condensing point of the first light coincides with the rear focal point of the projection optical system.

5. The vehicular lamp according to claim 1, wherein the polarization rotation element is a ½ wave plate.

6. The vehicular lamp according to claim 1, further comprising a second polarizing plate which is disposed in an optical path of the first light and the second light to enter the liquid crystal element and configured to transmit lights whose polarization directions coincide with each other out of the first light and the second light.

7. The vehicular lamp according to claim 2, further comprising a second polarizing plate which is disposed in an optical path of the first light and the second light to enter the liquid crystal element and configured to transmit lights whose polarization directions coincide with each other out of the first light and the second light.

8. The vehicular lamp according to claim 1, further comprising a plurality of the light sources, and a plurality of the condensing optical systems provided corresponding to the respective light sources, and wherein
   the plurality of condensing optical systems condense light emitted from the respective light sources toward focal points in coincidence with each other.

9. The vehicular lamp according to claim 2, further comprising a plurality of the light sources, and a plurality of the condensing optical systems provided corresponding to the respective light sources, and wherein
   the plurality of condensing optical systems condense light emitted from the respective light sources toward focal points in coincidence with each other.

10. The vehicular lamp according to claim 1, wherein the polarizing beam splitter is any of a polarizing beam splitter of a wire grid method and an optical multilayer film.

11. The vehicular lamp according to claim 1, wherein the liquid crystal element is any of a segment type and a dot matrix type and located at or near the rear focal point of the projection optical system.

12. The vehicular lamp according to claim 2, wherein the liquid crystal element is any of a segment type and a dot matrix type and located at or near the rear focal point of the projection optical system.

13. A vehicular lamp comprising:
a light source configured to emit light;
a projection optical system configured to have a rear focal point in a rear thereof so as to project light emitted from the light source forward;
a liquid crystal element which is arranged at the rear focal point of the projection optical system and configured to control an image of the light projected by the projection optical system;
a first polarizing plate which is disposed in an optical path between the liquid crystal element and the projection optical system and configured to transmit light of a specific polarization component;
a condensing optical system configured to condense the light emitted from the light source toward the liquid crystal element;
a polarizing beam splitter configured to transmit first light including one polarization component of the light emitted from the light source and reflect and separate second light including the other polarization component of the light emitted from the light source;
a reflecting optical system configured to reflect the first light toward the liquid crystal element; and
a polarization rotation element which is disposed in an optical path between the polarizing beam splitter and the liquid crystal element, and configured to rotate a polarization direction of one of the first light and the second light so that it coincide with the other light in terms of a polarization direction thereof,
wherein the condensing optical system is a condenser lens disposed in an optical path between the light source and the polarizing beam splitter,
wherein the reflecting optical system is a second reflector having a convex hyperbolic reflection surface, and
wherein the second reflector is configured to reflect the first light by the hyperbolic reflection surface so that the condensing point of the first light coincides with the rear focal point of the projection optical system.

14. A vehicular lamp comprising:
at least one light source configured to emit light;
a projection optical system having a rear focal point in a rear thereof and configured to project the light emitted from the light source forward;
a liquid crystal element located between the light source and the projection optical system and at or near the rear focal point of the projection optical system, the liquid crystal element being any of a segment type and a dot matrix type;
a first polarizing plate disposed in an optical path between the liquid crystal element and the projection optical system and configured to transmit light of a specific polarization component;
a polarizing beam splitter configured to transmit first light including one polarization component of the light emitted from the light source and reflect and separate second light including the other polarization component of the light emitted from the light source, the polarizing beam splitter being located in the optical path between the light source and the projection optical system, the polarizing beam splitter having a flat plate shape, the polarizing beam splitter and the first polarizing plate being disposed separately away from the liquid crystal element; and
a polarization rotation element disposed in an optical path between the polarizing beam splitter and the liquid crystal element, and configured to rotate a polarization direction of one of the first light and the second light so that it coincide with the other light in terms of a polarization direction thereof, wherein
the first light and the second light whose polarization directions are made to coincide with each other are condensed and allowed to enter the liquid crystal element.

15. The vehicular lamp according to claim 14, further comprising:
a condensing optical system that is a first reflector having a concave elliptical reflection surface having a first focal point located at or substantially at the light source and a second focal point, the first reflector being configured to reflect light from the light source to the second focal point while focusing the light toward the second focal point,
wherein the polarizing beam splitter is configured to reflect the second light so that the condensing point of the second light coincides with the rear focal point of the projection optical system.

16. The vehicular lamp according to claim 15, wherein the polarizing beam splitter is any of a polarizing beam splitter of a wire grid method and an optical multilayer film.

17. The vehicular lamp according to claim 14, further comprising a second reflector that is disposed in an optical path between the liquid crystal element and the polarizing beam splitter and configured to reflect the first light so as to condense the first light to the liquid crystal element.

18. The vehicular lamp according to claim 14, further comprising:
a first reflector having a concave elliptical reflection surface having a first focal point located at or substantially at the light source and a second focal point, the first reflector being configured to reflect light from the light source to the second focal point while focusing the light toward the second focal point, wherein the polarizing beam splitter is disposed at a position where direct light from the light source and light reflected by the first reflector reach; and
a second reflector that has a convex hyperbolic reflection surface, and is disposed in an optical path between the liquid crystal element and the polarizing beam splitter and configured to reflect the first light by the convex hyperbolic reflection surface so that a condensing point of the first light coincides with the rear focal point of the projection optical system where the second light is also condensed.

19. The vehicular lamp according to claim 14, further comprising a condenser lens disposed in an optical path between the light source and the polarizing beam splitter.

20. The vehicular lamp according to claim 14, further comprising circuitry configured to variably control a light distribution pattern of light to be projected from the projection optical system by outputting a control signal for controlling the liquid crystal element.

* * * * *